STATISTICAL TAPE ANALYZER

Filed May 7, 1954 3 Sheets-Sheet 1

INVENTORS
EDWARD J. RABENDA
DAVID W. RUBIDGE
BY James W. Fitzsimmons
ATTORNEY

INVENTORS
EDWARD J. RABENDA
DAVID W. RUBIDGE
BY
ATTORNEY

TABULATING STATISTICAL TAPE INFORMATION FROM FIG 1

| CHANNEL | 1ST SCAN | 2ND SCAN | 3RD SCAN | 4TH SCAN | 5TH SCAN |
|---|---|---|---|---|---|
| 1 | 0 | 0 | 0 | | |
| 2 | 2 | 2 | 2 | | |
| 3 | 2 | 2 | 5 | | |
| 4 | 0 | 0 | 0 | | |
| 5 | 2 | 2 | 0 | | |
| 6 | 0 | 0 | 0 | | |
| 7 | 5 | 5 | 5 | | |
| 8 | 5 | 5 | 5 | | |
| 9 | 0 | 0 | 0 | | |
| 10 | 2 | 4 | 4 | | |
| 11 | 2 | 2 | 5 | | |
| 12 | 0 | 0 | 0 | | |
| 43 | 4 | 7 | 7 | | |
| 44 | 0 | 0 | 7 | | |
| 45 | 2 | 2 | 5 | | |
| 46 | 0 | 0 | 0 | | |
| 47 | 7 | 7 | 7 | | |
| 48 | 7 | 5 | 5 | | |
| 49 | 7 | 7 | 7 | | |
| 50 | 0 | 0 | 0 | | |
| 51 | 0 | 0 | 0 | | |
| 52 | 0 | 0 | 0 | | |
| 53 | 0 | 0 | 0 | | |
| 54 | 0 | 0 | 0 | | |
| 55 | 2 | 2 | 2 | | |
| 56 | 2 | 2 | 5 | | |
| 57 | 0 | 0 | 0 | | |
| 58 | 0 | 0 | 0 | | |
| 59 | 0 | 0 | 0 | | |
| 60 | 0 | 0 | 0 | | |

INVENTORS
EDWARD J. RABENDA
DAVID W. RUBIDGE
BY [signature]
ATTORNEY

United States Patent Office 2,803,402
Patented Aug. 20, 1957

2,803,402

STATISTICAL TAPE ANALYZER

Edward J. Rabenda, Poughkeepsie, N. Y., and David W. Rubidge, Chatham, N. J., assignors to International Business Machines Corporation, New York, N. Y., a corporation of New York Application May 7, 1954, Serial No. 428,202

13 Claims. (Cl. 235—61.1)

This invention relates to a device for analyzing statistical tapes, and more particularly to a device for punching summary data read from statistical tapes into cards.

Statistical tapes frequently are prepared to represent factual situations in aggregate. In order to utilize the factual information, it is necessary to segregate the data and assemble it in a useable fashion, for example, by punching it into cards.

By way of example, statistical tapes are prepared for television channel surveys or for radio listening surveys, and reference is made to such a typical statistical data installation for the sole function of pointing out more particularly the theory and fundamental principles of this invention, but it is to be understood that this illustration is not intended in any way to limit the scope of this invention.

In one embodiment, a statistical tape is prepared by first selecting a number of residences within a pre-determined listening area. For example, a certain number of doctors, lawyers, bricklayers, clerks, schoolteachers, etc., are chosen to form a cosmopolitan group. The overall number of listening sets might be sixty for one survey. Next, a high frequency unit is installed in the individual residence radio or television set which unit, through a telephone line, can indicate at a distant central station, the television channel to which the listener's set is tuned. The information that is sent over the telephone line is punched into a tape.

At the central station, a tape punch is connected periodically (usually every 3 minutes) by a commutator arrangement to each of the sixty chosen survey sets. Accordingly, each of the survey sets is selectively read during a three minute interval. An electronic device in each set determines the channel to which it is tuned and sends a message over the telephone wire to the central location where a paper tape is punched to indicate the tuned channel. A typical test lasts 15 minutes, and accordingly, each set is connected to the tape punch five times during this period.

After a survey has been made, the tape contains statistical data which can be read and when properly interpreted will indicate the listening time and channel for each survey set.

It is an object of this invention then to provide a device which will analyze a statistical tape such as that produced during a television listening survey, and to punch summary cards in accordance with the statistical data in the tape thereby to indicate the channel and tuned-in time of each of the survey sets, respectively.

It is a further object of this invention to provide a device which will analyze a statistical tape, and punch a card each time a change takes place in a periodically recurring statistical element.

It is a further object of this invention to provide a device which will compare conditions in periodically recurring statistical elements at successive statistical periods, and accumulate in a storage tape information which will indicate the duplication of conditions in the statistical elements.

It is a further object of this invention to provide a device which will analyze a statistical tape and punch into a card information which indicates a period of time during which a statistical element has remained under the same conditions.

Other objects of the invention will be pointed out in the following description and the claims and illustrated in the accompanying drawings, which disclose by way of example, the principle of the invention and the best mode which has been contemplated of applying that principle.

Referring to the drawings.

The following introductory statement seems proper in order to define the function of the mechanism that hereinafter will be described.

Two paper tapes are used: one, a statistical tape, is commercially prepared as hereinbefore described and it contains information in aggregate; the other, a storage tape, is prepared in response to information read from the statistical tape.

Specifically, the storage tape has an index point for each index point or survey set in the statistical tape. The index points are cyclically repeated and each time a condition is the same for an index point in two successive cycles of the statistical tape, a mark indicating one unit is added to the storage tape at its corresponding index point. However, if a condition is changed for a statistical tape index point between successive cycles, then a zero hole is punched at the corresponding point in the storage tape and a card is punched to record the information contained in both the statistical and storage tapes for that index point at the previous cycle.

Figure 1:
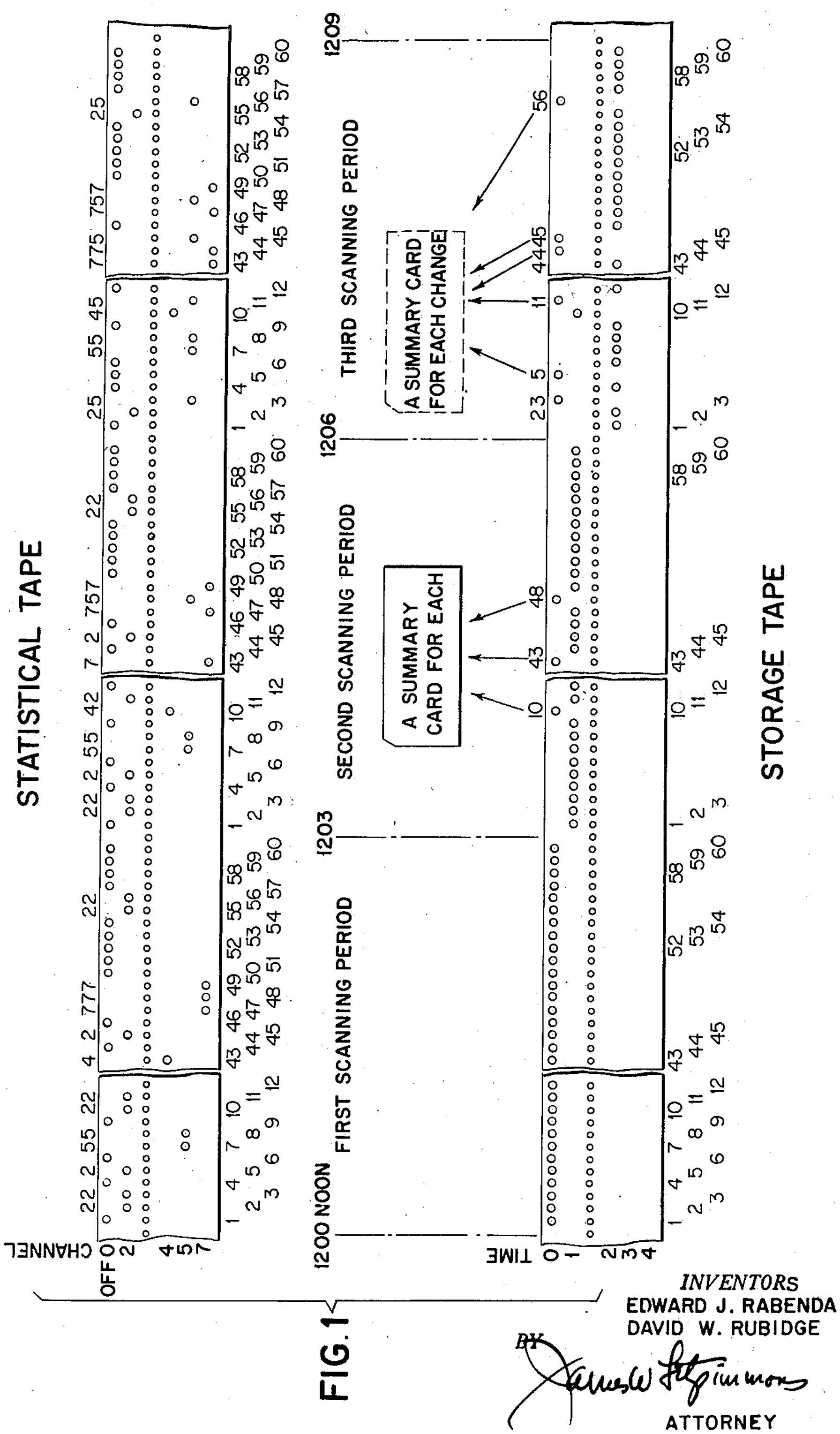
Fig. 1 is a plan view of a pair of paper tapes used in this improved statistical tape analyzing device.
Figures 3, 4:
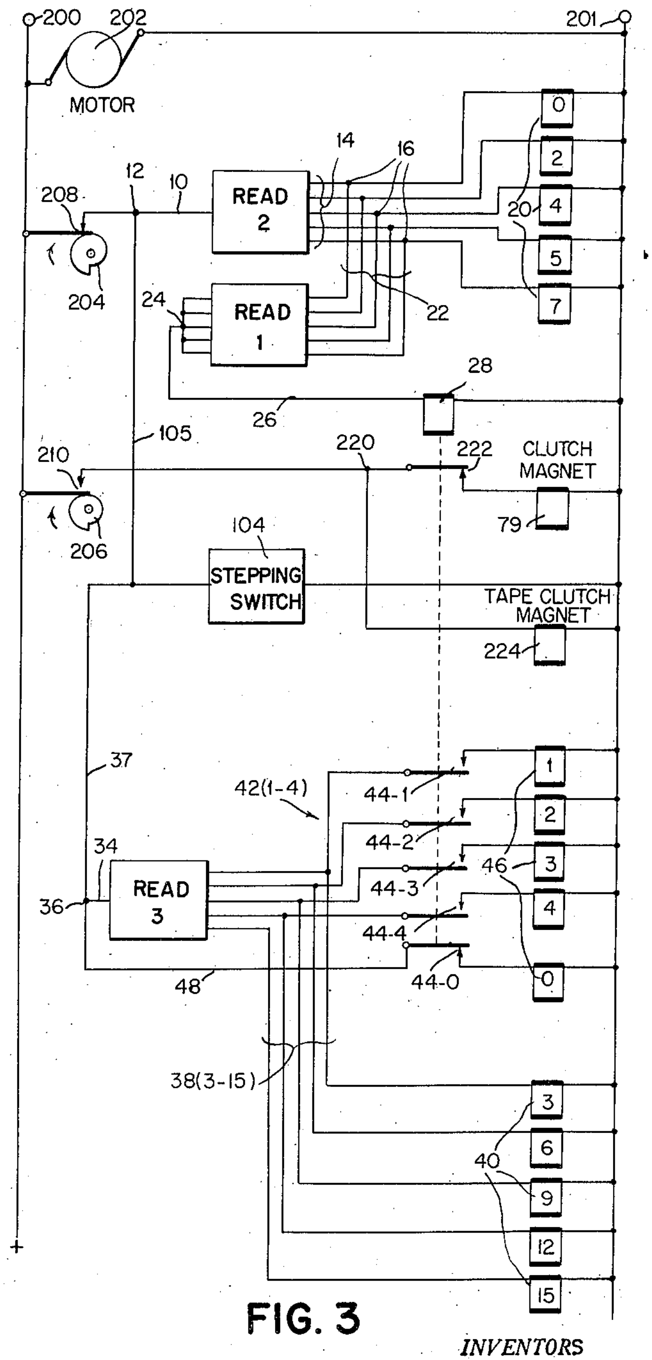
Fig. 3 is a schematic wiring diagram of the analyzing device.
Fig. 4 is a tabulation of the information contained in the statistical tape shown in Fig. 1.

Referring now to Fig. 1, reference is made to a commercially prepared statistical tape wherein for each of sixty survey sets, one of five transverse positions has been punched during a first, second, and third scanning period. The statistical tape can be defined as having a plurality of index points repeated in cyclic order with each index point representing statistical data. Each of the survey sets is scanned, in accordance with the embodiment shown in Fig. 1, during three minute cycles, starting at 12:00 o'clock noon. Survey set #1 for example, is shown turned off at 12:00 o'clock, at 12:03 and 12:06. Fig. 1 also shows a storage tape wherein one of five transverse positions has been punched in correlation with scanning periods of the statistical tape. That is, for each index position of the statistical tape, there is a corresponding index position on the storage tape. Accordingly, by correlating the positions of receiver #1 on the statistical tape with positions of receiver #1 on the storage tape, it can be seen that the zero hole in the storage tape is punched at 12:00 (first scanning period), while at 12:03 (second scanning period) one unit of time has been added, as represented by the fact that the #1 hole in the storage tape has been punched. At 12:06 (third scanning period) survey set #1 shows still another unit of time as represented by the fact that the #2 hole in the storage tape has been punched (set still off). Accordingly, at the 12:06 reading, the storage tape contains information which indicates in conjunction with the punchings in the statistical tape that survey set #1 has been turned off for six minutes (Fig. 4 shows a tabulation of this information).

Reference is again made to Fig. 1 (also see Fig. 4) wherein survey set or receiver #2 is shown during the first scanning period on the statistical tape as being tuned to channel 2; at second scanning period (12:03), receiver #2 is still tuned to channel 2 and during the third scanning period (12:06), receiver #2 is again tuned to channel 2. Since there has been no change in survey set #2, the storage tape shows the "0" hole in the tape punched at 12:00, the #1 hole punched at 12:03, and the #2 hole in the tape punched at 12:06. The correlated information in the two tapes indicates that receiver #2 has been tuned to the channel 2 for two listening periods, or a total of six minutes.

Reference is again made to Fig. 1 (also see Fig. 4) and particularly to that information dealing with survey set or receiver #10. The statistical tape indicates that receiver #10 was tuned to channel 2 during the first scanning period (12:00), that survey set #10 had been changed before (12:03) to channel 4. At 12:06, survey set #10 is still tuned to channel 4. Referring now to the storage tape, and that index point indicating survey set #10, it can be seen that the first scanning section (12:00), the zero hole in the tape is punched; at the second scanning section of 12:03, the zero hole in the tape is again punched. This indicates that at the time of the second scanning period (12:03), receiver #10 had been tuned to a channel different from that to which it had been tuned at the first scanning period (12:00). Referring now to the third scanning period for receiver #10, since it is still tuned to channel 4, the #1 hole in the storage tape has been punched indicating that the receiver was tuned to the same channel for two successive scanning periods.

Referring now to receiver #11, it will be seen that at the first scanning period (12:00), it is tuned to channel 2; at the second scanning period (12:03), receiver #11 is still tuned to channel 2, while at the third scanning period (12:06), receiver #11 has ben tuned to channel 5. This change is reflected in the storage tape as follows: For receiver #11, the zero tape hole punched at 12:00, the #1 hole in the tape has been punched at 12:03, and the change is reflected in the third scanning section, since for receiver #11 at 12:06, the zero hole has been punched in the storage tape.

The storage tape in Fig. 1 indicates that survey sets 10, 43 and 48 were switched from one channel to another between the first and second scanning periods. Survey sets 3, 5, 11, 44, 45, 56 were switched from one channel to another between the second and third scanning periods. The changes are tabulated in Fig. 4. Cards are punched in response to these changes by mechanism which will be described later.

*Statistical tape section*

Figure 2:
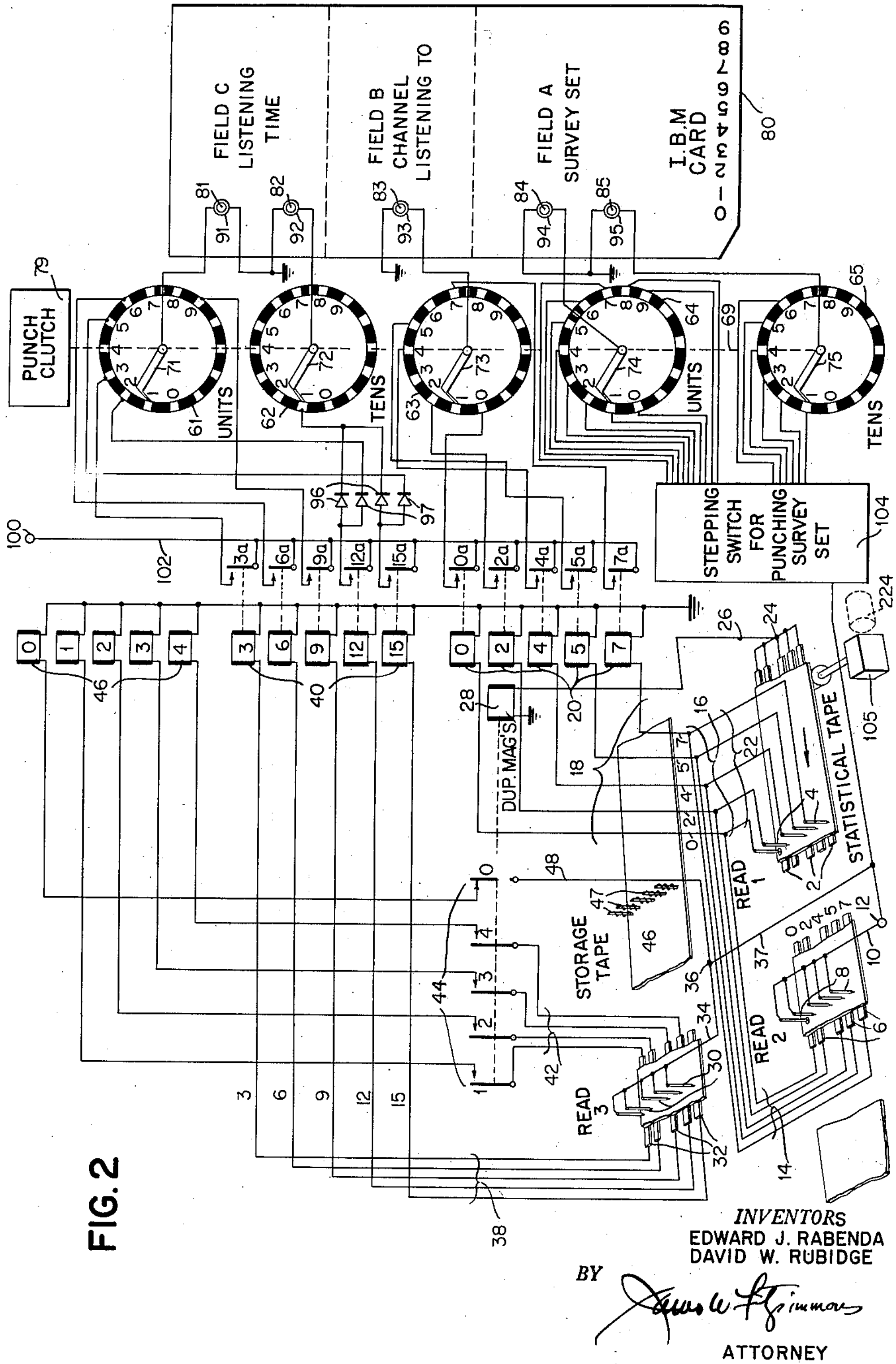
Fig. 2 is a schematic diagram showing the basic operating principles of the analyzing device.

Referring now to Fig. 2, a statistical tape is shown moving from right to left under read station #1 and then under read station #2. The distance between read station #1 and read station #2 is commensurate with the length of tape between two successive survey readings for the same survey set. That is, in order to compare successive survey set readings, a statistical tape index point representing survey set #1 is under read station #1, while another statistical tape index point representing the previous reading for survey set #1 is simultaneously under read station #2.

The read stations #1 and #2 above mentioned are devices for reading punchings in a statistical tape and for emitting electrical impulses in response to holes in the tape. Such tape readers cyclically step the tape one index position, read that position, and then, after a predetermined interval, step the next index point into read position. While it is not intended to limit this invention thereby, one such tape reader is shown in U. S. Patent #2,320,788 issued to A. W. Mills et al.

Once again, it is to be pointed out that if the punchings for two successive survey period readings are identical, then the function of this device is to punch into the storage tape a unit of listening time which is one higher in order than that which had been previously recorded. However, if the punchings for the two successive survey period readings are not the same, then it is the intention to punch a zero hole in the storage tape, and to punch a card indicating the tuned channel and the amount of listening time for that channel. This information is read from the statistical tape and storage tape for that index point at the earlier scanning period.

Referring again to Fig. 2, assume that successive punchings for survey set #1 are simultaneously under read station #1 and read station #2. As shown, survey set #1 was tuned off at 12:00 and at the next successive survey period (12:03), was still tuned off.

In the embodiment shown, contact strips 2 are shown at read station #1 positioned for contact with pins 4 through punchings in the tape. Similarly, at read station #2, contact strips 6 are positioned for contact with pins 8 through punchings in the tape. The pins 8 are connected to a common conductor 10 which in turn is connected to a potential source indicated by terminal 12.

The contact or commutator strips 6, underlying points representing channels 0, 2, 4, 5 and 7 on the statistical tape, are connected respectively by conductors 14 to terminals 16 (0, 2, 4, 5, 7). Accordingly, a signal passing from the terminal 12 through common conductor 10 and one of the pins 8 sensing a tape punching to a contact strip 6 will pass along one of the conductors 14 to a terminal 16. From the terminal 16 the pulse can follow two paths: that is, it can pass upwardly along conductors 18 and through relay windings 20 (0, 2, 4, 5, 7) to ground: simultaneously, the pulse can pass downwardly through conductors 22 to the pins 4, through tape punchings to the contact strips 2 which are connected at a common point 24. Any pulse delivered to this point passes through a conductor 26 and a duplicate magnet 28 to ground.

It will be noted here that with the tape reader of the type suggested by the aforementioned U. S. Patent 2,320,788, the pins sense for only a very brief interval, and consequently, in order to store the information read in the tape, it is necessary to use either holding circuits or latching relays. For simplicity, the duplicate magnet 28 and all the relays described in this application will be considered as latching relays that are picked up in response to information read in one tape read cycle and then unlatched just before the next tape read cycle.

With this arrangement of parts then, provided the punching under read stations 1 and 2 are identical, both the duplicate magnet 28 and one of the relay windings will be energized. On the other hand, if the simultaneous readings for any survey station are not identical at read station 1 and read station 2 (see Fig. 1, set #10 scanning periods 1 and 2) then the duplicate magnet 28 will not pick up but one of the relay windings 20 will be energized, depending upon the punching in the tape under read station 2, and, at a suitable instant later (as hereinafter described), a card will be punched to indicate the channel information which was read at read station 2.

*Storage tape section*

Reference is now made to the function of the storage tape which is to count in units (up to a total of five in the embodiment shown) the number of repetitions of a condition at one index point of the statistical tape. This is effected in the present example by punching into the storage tape one additional unit of listening time for each occasion that the statistical tape readings under read station 1 and read station 2 are identical. When the readings between the read station 1 and read 2 of the statistical tape are different, however, then the storage tape functions to supply time information to be punched into a card.

In order to accomplish these results, a storage tape (Fig. 2) is moved from right to left under punch elements 47 and then under a tape read station 3 which is provided with reading pins 30 and contact or commutator strips 32 in aligment with the 0, 1, 2, 3, 4, positions on the storage tape. The storage tape has a plurality of index positions arranged in cyclically repeated groups with each index position being assigned to correspond to one of the index points of the statistical tape respectively. The tape reader at station 3 which is positioned along a reference line to read a statistical tape position corresponding to the index point under read station 2 is substantially the same type as that at station 1 and read station 2. The tape punch is positioned one storage tape cyclic length from the reference line to correspond to the statistical tape index point under read station 1. The tape punch has its punch elements 47 actuated by selectively energized magnets 46 to perforate the tape.

The pins 30 are connected by means of a common conductor 34 to a terminal 36 which is connected through a conductor 37 to the supply terminal 12. Consequently, upon the sensing of a perforation by one of the pins 30, a pulse emanates from the terminal 12 and passes along the conductors 37, 34 and through the pin 30, sensing the perforation to one of the contact strips 32. Conductors 38 connect the contact strips 32 in the 0, 1, 2, 3, 4 positions to relay windings 40 (3, 6, 9, 12 and 15), respectively, and conductors 42 connect the strips in the 0, 1, 2 and 3 positions through contacts 44 of the Duplicate Magnet 28 (1, 2, 3, 4) and the tape punch magnets 46 (1, 2, 3, 4) to ground. Upon the sensing of a perforation in the storage tape at read station No. 3, a circuit is completed through one of the conductors 38 and one of the relays 40 to effect a punching of a card, when other conditions to be described are satisfied, at a position indicating that the listening time at a station has been 3, 6, 9, 12 or 15 minutes. At the same time, another circuit is completed through a conductor 42 and a contact 44, if the magnet 28 has been energized, to energize a magnet 46 to actuate a punch 47 for effecting a punching in the storage tape at the next higher numbered position above that at which the hole was sensed by the reading pin 30.

By this arrangement, the storage tape is punched at the next higher position each time the survey set is tuned to the same channel during two successive scanning periods. This is due to the fact that the duplicating magnet 28 is energized when holes are sensed in corresponding positions on the statistical tape at read stations 1 and 2. If the holes sensed at these stations were in different positions, then the magnet 28 would not be energized and a contact 44–0 would remain closed while the contacts 44 (1, 2, 3, 4) remained open.

It can be noted from Fig. 2 that there is one additional circuit, or zero circuit 48 which goes to the tape punch magnet 46–0 through the normally closed contact 44–0 controlled by the duplicate magnet 28.

The purpose of the zero circuit is to condition the tape punch magnet 46–0 to punch a zero hole in the storage tape each time a condition is changed in a survey set between two successive scanning periods. Accordingly, as can be seen from the wiring diagram (Fig. 3) hereinafter described, each time an index point on the statistical tape reaches read station #1, the tape magnet 46–0 will be energized. However, if the duplicate magnet 28 is energized (repeat condition for the index point), then the zero magnet 46–0 will drop out, and one of the other magnets 46 (1–4) will be picked up.

*Card punch*

Reference is now made to mechanisms shown in the right half of Fig. 2 for punching cards. Primarily, a plurality of commutator rings 61, 62, 63, 64, 65 are arranged about a shaft 69 carrying rotors 71, 72, 73, 74, 75, respectively. Shaft 69 is connected through a clutch 79 to a continuously rotating shaft (not shown). When clutch 79 is energized, shaft 69 is rotated through 360° causing rotors 71–75 to sweep the segments of rings 61–65.

Shaft 69 is timed with respect to a card feeding device (not shown) so that rows of points, numbered 0 to 9, on a card 80 pass under punches 81, 82, 83, 84, 85 in synchronism with the movement of the rotors 71 to 75 over correspondingly numbered segments. Associated with the punches 81 to 85 are solenoids 91 to 95 which are connected at one side to ground and are connected at the opposite side to the rotors 71 to 75, respectively.

In order to energize the ring segments, a voltage terminal 100 is connected by a conductor 102 to one side of the contacts (**3*a*, 6*a*, 9*a*, 12*a*, 15*a*) for relays 40 and to one side of the contacts (0*a*, 2*a*, 4*a*, 5*a*, 7*a*) for relays 20. The other side of the contacts 3*a*, 6*a* and 9*a* for relay 40 are connected to correspondingly numbered segments on the commutator 61 while contacts 12*a* and 15*a* are connected through rectifiers 96 to the No. 1 segment of commutator 62 and through rectifiers 97 to the Nos. 2 and 5 segments of commutator 61. The other side of the contacts for relays 20 are connected to correspondingly numbered segments of commutator 63**.

A stepping switch 104 is employed to send a pulse to the segments of rings 64, 65. While the details of the stepping switch are not shown, since they are well understood in the art, it is pulsed from terminal 12, as described later, so that it registers with one of the index points on the statistical tape representative of the survey sets. As the stepping switch is advanced by pulses from terminal 12, it applies a voltage to the segments of rings 64 and 65, corresponding to the numbers of the survey sets.

With the structure described, it is apparent that upon the selective energization of the relay windings 20 and 40, relay contacts are picked up to apply a voltage to the segments of rings 61, 62 and 63 representative of the station tuned to and the time during which the set was so tuned. At the same time, the stepping switch assumes a position to apply a voltage to segments of the rings 64 and 65 representative of the number of the survey set which produced the punching in the portion of the tape being read by the pins 4 at read station No. 1. If the rotors 71 to 75 are now caused to sweep about their respective rings, the punch solenoids 91 to 95 will be energized to effect the punching of information into a card. As described later, the clutch 79 is energized to cause a rotation of the rotors only when the holes sensed in the statistical tape at read stations Nos. 1 and 2 are in different locations.

Reference is now made to the schematic wiring diagram of Fig. 3 in which there is shown a motor 202 connected between a positive terminal 200 and a ground terminal 201. Driven from the motor by any suitable means, not shown, is a pair of cams 204 and 206 which respectively close a read switch 208 and a punch switch 210. It will be noted that the lobe of the cam 206 is about 90° behind the lobe of the cam 204, and accordingly, the punch switch 210 will not be closed until some time after the read switch 208 has been closed. The timing of cam 204 is such that a new index point on the statistical tape is in read position before the switch 208 is closed. This provides for the picking up of all the relays and magnets before the tape and the card are punched.

The closing of the read switch 208 provides a pulse for four different parallel circuits. First, it provides a pulse at terminal 12 which is transferred through the common conductor 10 to read station 2, which, of course, means passing through the read pins 8 and through any perforations in the tape to the contact strips 6. Any pulse getting through the tape will pass selectively along the conductors 14 to one of the terminals 16, and then pick up one of the relays 20 and continue to ground.

That is, it will pick up the relay corresponding to the hole in the tape under read 2. From terminal 16, a pulse will also pass along conductors 22 to read station 1, and if the hole in the tape at read 1 is the same as that at read station 2, then the pulse will get through read station 1 and along a conductor 26 to pick up the duplicate magnet 28 and then to ground.

The second parallel circuit from terminal 12 is along conductor 105 to the stepping switch 104 which steps through 60 different positions that are correlated with the sixty survey stations or index points on the statistical tape. Accordingly, each time a pulse gets through read switch 208, the stepping switch receives a pulse to advance it one step, and thereby energize the proper segments of rings 64, 65 (Fig. 2) so that when the card punch goes through a punch cycle, the survey set number or index point being read is punched into the card 80.

The third parallel circuit leads from conductor 105 through conductor 37 to terminal 36, and then through conductor 34 to storage tape read station 3. A pin 30 sensing a hole in the storage tape at station 3 makes connection with one of the contact strips 32. A circuit is then complete through one of the conductors 38 to one of the relays 40, and, if the duplicate contacts 44 (1 to 4) are closed, another circuit is complete through one of the conductors 42 and contact 44 to one of the punch magnets 46. Accordingly, one of the relays 40 will be energized to close its contacts so as to apply a voltage to the segments of ring 62 corresponding to the time represented by the hole sensed in the storage tape. The magnet 46 in the position next higher than that of the hole sensed will also be energized to effect a punching of the storage tape.

The fourth parallel circuit extends from terminal 36 along conductor 48 and through the normally closed contact 44–0 to the tape punch magnet 46–0. This circuitry provides for the energization of the zero tape punch magnet 46 when none of the other magnets 46 are energized, and this condition exists each time that the read stations 1 and 2 fail to sense holes in corresponding positions on the statistical tape, thereby detecting a change in tuning of the set. By the failure to sense holes in corresponding positions, the duplicating magnet 28 remains de-energized so that the switch contacts 44 remain in their normal positions.

In summary, a pulse passing through the read switch 208, as it is closed by the cam 204 passes simultaneously through read station 2 and through read 1 if the punchings in the tape under read 2 and read 1 are identical. The pulse through read 2 picks up one of the relays 20, and the pulse through read 1 picks up the duplicating magnet 28. Another pulse is delivered through the read station No. 3 to one of the relays 40, and, at the same time, one of the storage tape punch magnets 46 (1 to 4) is energized if the switch contacts 44 (1 to 4) are closed. If the holes sensed in the statistical tape are at different locations, the duplicating magnet 28 is not energized and the contacts 44–0 remain closed to effect an energizing of the punch magnet 46–0. Each closing of the cam contacts 208 results in an operation of the stepping switch 104 for applying a voltage to segments of the rings 64 and 65 representative of the number of the survey set.

Naturally, the timing of the cams as driven by the motor 202 is controlled so that all the read information is set up in the proper magnets before the card punch and the tape punch are sent through a punch cycle. Accordingly, the cam 206, as heretofore mentioned, has its lobe timed behind the lobe of cam 208, whereby switch 210 is closed after all the read information is into the storage positions. From switch 210, a pulse passes from the terminal 220 through the normally closed contact 222 to the card clutch magnet 79 to ground; and simultaneously the pulse energizes the tape punch clutch magnet 224.

The contact 222, however, is open if the duplicate magnet 28 has been energized, and the reason for this is that even though information is put into storage at the card punch magnet every time a pulse passes through read station 2, the stored information is not to be punched into an IBM card, if the statistical tape under read station 1 and read station 2 has identical punching. On the other hand, the tape punch clutch magnet 224 is energized every time the cam 206 closes the switch 210 since a hole is always to be punched in the storage tape at the tape punch station, and this punching is either going to be the zero hole as controlled by the interposer magnet 46–0 or a hole designating some increment of time as controlled by one of the tape punch time interposer magnets 46 (1, 2, 3, 4).

With the circuitry shown in the schematic wiring diagram of Fig. 3, it can be understood that the focal point of the mechanism is whether or not the duplicate magnet 28 is picked up; and it is picked up only if the information under read station 2 is identical to the information under read station 1. If the duplicate magnet 28 picks up, then the only information punched will be that put into the storage tape.

*Operation*

With this background information, as described, the operation of the apparatus can best be understood in conjunction with examples of actual operating conditions.

Typical radio and television monitoring surveys are made over a 15 minute period. As the initial statistical tape punchings for each of the sixty survey sets passes under read station 1, and on the assumption that there is either blank tape under read station 2 or the pins 8 manual are held open, then there will be no pulse in the conductors 14 and consequently, neither the magnets 20 nor the duplicating magnet 28 will pick up. Similarly, since either there will be blank tape in the storage tape read station 3, or the contacts manually will be held open, neither the magnet 46 nor the magnets 40 can pick up. With this condition, i. e., no perforation at station two and one at station one indicating a change, a pulse will pass along conductor 48, through the normally closed contact 44–0 to pick up the zero magnet 46–0, and thereby a zero will be punched in the storage tape by the elements 47. Accordingly, while the punchings for the first scanning period pass under the read station 1, only zeros will be punched in the storage tape for index points 1–60.

Three minutes after the initial reading of survey set #1 (that is with respect to statistical tape position, not actual time), then simultaneously, punchings for the second scanning period for set #1 will be under read station 1 while the punchings for the initial reading of set #1 will be under read station 2. Also the zero punching in the storage tape for survey set #1 will be under the storage tape read station 3 and a blank space of the storage tape which is assigned to survey set #1 is in position under the punch elements 47.

In the embodiment shown (Figs. 1 and 4), it will be noted that survey set #1 was turned off (as represented by the 0 punch in the statistical tape) at both the initial reading and at the second reading. Accordingly, tracing the circuit (Figs. 2 and 3) a pulse leaves terminal 12, after the closing of switch 208 passes along conductor 10 through pin 8–0 to contact strip 6–0 then along conductor 14–0 to terminal 16–0. The pulse then goes up conductor 18–0 to pick up card punch magnet 20–0, and a pulse also passes along conductor 22–0 and through pin 4–0 to contact strip 2–0 and continues along conductor 24–0 to terminal 26 and then picks up duplicate magnet 28. When duplicate magnet 28 is picked up, the normally closed contact 222 in card clutch magnet circuit is opened, thus preventing a card punch cycle. Simultaneously, the duplicate magnet 28 closes the adder contacts 44 (1–4) and opens the normally closed contacts 44–0. Accordingly, the pulse from terminal 12 cannot pass through conductor 48 to the tape punch magnet 46–0, and instead a pulse will pass from terminal 36 along conductor 34 through pin 30–0 of read 3 (since 0 is punched in tape)

to contact strip 32–0, and then along conductor 38 (3) to pick up magnet 40–3. However (as above described), since the duplicate magnet 28 has opened contact 222, the card punch clutch magnet will not be energized, and hence information from the storage tape at read 3 will not be punched in the IBM summary card. Instead the pulse passing from commutator strip 32–0 which also passes (in parallel) through conductor 42–1 and duplicate contact 44–1 to pick up the tape punch interposer magnet 46–1 with the resulting punching of a 1 unit in the storage tape by one of the elements 47 after the tape punch clutch magnet 224 has been energized by a pulse through switch 210.

Assume now that at the third scanning period which would be six minutes after the initial reading, a survey set has changed channels (see survey set #3 change from channel 2 to channel 5 (Figs. 1 and 4). Then when the third read period for set #3 is under read station 1, the second scanning period for that survey set will simultaneously be under read station 2. Also, the storage tape position for scanning period 2 will be under storage tape read station 3, and a blank section of tape will be under the punch elements 47.

Under these conditions, a pulse from terminal 12 will pass along conductor 10 and through pin 8–2 to commutator strip 6–2 and then along conductor 14–2 to terminal 16–2. Now, since the hole in the tape at read 1 is at the 5 position instead of the 2 position, the pulse will pass up conductor 18–2 to pick up the card magnet 20–2, but duplicate magnet 28 will not pick up. Simultaneously (storage tape) a pulse from terminal 36 will pass along conductor 34 and along pin 30–1 to contact strip 32–1. This pulse cannot pass from contact strip 32 through the duplicate contacts 44–2 (since they are open), but the pulse can pass through conductors 38–6 to pick up the magnet 40–6.

Simultaneously, a pulse will pass along conductor 48 and through normally closed contact 44–0 to pick up the tape punch interposer magnet 46–0.

With the channel and time interposers picked up, and with the stepping switch set to survey set #3, a punch cycle will take place through the closing of switch 210 by cam 206 to energize the card punch clutch 79 whereby an IBM card will be punched to read the information that survey set 3 had listened to channel 2 for six minutes. Simultaneously, since contact 44–0 is closed, and since the tape punch clutch is energized, the tape punch will punch a zero in the storage tape at that position corresponding to the third scanning period position for survey set #3.

After the complete survey period of 15 minutes has elapsed, the statistical tape for each of the survey set positions will be blank, and accordingly, a pulse cannot get through any of the pins 4 at read 1 (statistical tape) for any of the survey sets, and, therefore, since the duplicate magnet 28 cannot pick up, a summary card will be punched for each of the survey sets indicating the channel last listened to, and the number of listening units of time during which that channel was connected.

With the apparatus as thus described, it is obvious that an IBM summary card will be punched each time a condition change takes place between any two successive reading periods in the statistical tape, and further that a summary card will be produced at the termination of the complete survey period for each of the survey sets.

Once again, it should be pointed out that while this invention was described with respect to apparatus used in conjunction with a television listening survey, the principles of this invention are applicable to any reading of a statistical tape wherein the successive readings for each index point pass through read stations at predetermined spaced intervals.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A device for analyzing a statistical tape having a plurality of index points repeated in cyclic order with each index point representing statistical data comprising a storage tape having a plurality of index positions assigned to correspond to said statistical tape index points, means comparing two successive cycles of an index point on said statistical tape, a reference position for locating one end of a cyclic length of each of said tapes, means reading said storage tape at said reference position, recording means, means connecting the same with said storage tape read means and with said statistical tape comparing means at said reference position, and circuit means operating said recording means to record the information in both tapes at said reference position when the data at two successive cycles of an index point on said statistical tape is not identical.

2. A device for analyzing a statistical tape having a plurality of index points repeated in cyclic order comprising a storage tape having a plurality of index positions assigned to correspond to said statistical tape index points, means comparing two successive cycles of an index point on said statistical tape, a reference position for locating one end of a cyclic length of each of said tapes, means reading said storage tape at said reference position, storage tape marking means displaced one storage tape cyclic length from said reference position, recording means, means connecting the same with said storage tape read means and with said comparing means at said reference position, and circuit means cyclically operating said recording means to record the information in both tapes at said reference positions when the data at said two successive cycles of an index point on said statistical tape is not identical and for operating said storage tape marking means.

3. A device for segregating aggregate information contained at cyclically repeated index points on a statistical tape comprising, a storage tape having a plurality of index positions assigned to correspond to said statistical tape index points, a first statistical tape reader positioned to read one statistical tape index point, a second statistical tape reader positioned at a reference line to read a corresponding statistical tape index point at the previous statistical tape cycle, a storage tape reader positioned to read an index position corresponding to the statistical tape index point at said reference line, means comparing the information read in said statistical tape at said first and second tape readers, recording means, means interconnecting said recording means with said storage tape reader and with said second statistical tape reader, circuit means responsive to conditions in said comparing means for operating said recording means to record simultaneously the information at said storage tape reader and said second statistical tape reader.

4. A device for segregating aggregate information contained at cyclically repeated index points on a statistical tape comprising, a storage tape having a plurality of index positions assigned to correspond to said statistical tape index points, a storage tape reader and a storage tape punch spaced apart to register respectively with successive cycles of an index position on said storage tape, a first statistical tape reader positioned to read one statistical tape index point, a second statistical tape reader positioned to read the corresponding statistical tape index point at the previous cycle, means comparing the information read in said statistical tape at said first and second tape readers, means interconnecting said storage tape reader with said storage tape punch, and circuit means responsive to conditions in said comparing means for operating said tape punch to record information under the control of said storage tape reader when the information at successive cycles of an index point is identical.

5. A device for segregating aggregate information contained at cyclically repeated index points on a statistical tape comprising, a storage tape having a plurality of index positions assigned to correspond to said statistical tape index points, a storage tape reader and a storage tape punch spaced apart to register respectively with successive cycles of an index position on said storage tape, a first statistical tape reader positioned to read one statistical tape index point, a second statistical tape reader positioned to read the corresponding statistical tape index point at the previous cycle, means comparing the information read in said statistical tape at said first and second tape readers, recording means, means interconnecting said recording means with said storage tape reader and with said second statistical tape reader, circuit means responsive to conditions in said comparing means for operating said recording means to record simultaneously the information at said storage tape reader and said second statistical tape reader, means interconnecting said storage tape reader with said storage tape punch, and said circuit means being further responsive to other conditions in said comparing means for operating said tape punch to record information under the control of said storage tape reader.

6. A device for analyzing a statistical tape having a plurality of index points repeated in cyclic order with each index point representing statistical data comprising, a storage means having a plurality of index positions assigned to correspond to said statistical tape index points, means simultaneously comparing the data of corresponding statistical tape index points at two successive cycles, means reading said storage means at its index position corresponding to the earlier of said two successive cycles, storage marking means, means interconnecting said storage read means and said storage counting means, circuit means responsive to the operation of said comparing means for operating said storage marking means to register a mark of one unit greater value than the unit at said storage read means when the information in said two successive cycles of a statistical tape index point is identical.

7. A device for analyzing a statistical tape having a plurality of index points repeated in cyclic order with each index point representing statistical data comprising, a storage tape having a plurality of index positions assigned to correspond to said statistical tape index points, means simultaneously comparing the data of corresponding statistical tape index points at two successive cycles, a storage tape reader positioned to read a storage tape index position corresponding to the earlier statistical tape index point of said two successive cycles, storage tape marking means positioned at a storage tape index position corresponding to the later statistical tape index point of said two successive cycles, means conditioning said storage tape marking means to mark said storage tape to indicate a zero condition when said comparing means notes a difference of condition in said two successive cycles of an index point.

8. A device for analyzing a statistical tape having a plurality of index points repeated in cyclic order with each index point representing satistical data comprising, a storage tape having a plurality of index positions assigned to correspond to said statistical tape index points, means simultaneously comparing the data of corresponding statistical tape index points at two successive cycles, a storage tape reader positioned to read an index position cycle corresponding to the earlier statistical tape index point of said two successive cycles, storage tape marking means positioned at an index position corresponding to the latter statistical tape index point of said two successive cycles, means connecting said storage tape reader and said marking means, means conditioning said storage marking means to mark said storage tape to indicate a unit one greater in value than that at said storage tape reader when said comparing means indicates repetition of a condition at successive cycles of an index point.

9. A device for analyzing a statistical tape having a plurality of index points repeated in cyclic order with each index point representing statistical data comprising, a storage tape having a plurality of index positions assigned to correspond to said statistical tape index points, means simultaneously comparing the data of a statistical tape index points at two successive cycles, a storage tape reader positioned to read an index position corresponding to the earlier statistical tape index point of said two successive cycles, storage tape marking means positioned at an index position corresponding to the latter statistical tape index point of said two successive cycles, recording means, means interconnecting said recording means with said storage tape reader and with said comparing means at the earlier of said two successive cycles, circuit means responsive to conditions in said comparing means for operating said recording means to record simultaneously the information in said tape reader and said comparing means at the earlier cycle, and means conditioning said storage tape marking means to mark said storage tape to indicate a zero condition when said recording means is operated.

10. A device for analyzing a statistical tape having a plurality of index points repeated in cyclic order with each index point representing statistical data comprising, a storage tape having a plurality of index positions assigned to correspond to said statistical tape index points, means simultaneously comparing the data of corresponding statistical tape index points at two successive cycles, a storage tape reader positioned to read an index position corresponding to the earlier statistical tape index point of said two successive cycles, storage tape marking means positioned at an index position corresponding to the latter statistical tape index point of said two successive cycles, recording means, means interconnecting said recording means with said storage tape reader and with said comparing means at the earlier of said two successive cycles, means connecting said storage read means and said marking means, means conditioning said storage marking means to mark said storage tape to indicate a unit one greater in value than that at said storage read means when said comparing means indicate repetition of a condition at successive cycles of an index point.

11. A device for analyzing a statistical element having a plurality of index points repeated in cyclic order with each index point representing statistical data comprising, storage means having a plurality of index positions assigned to correspond to said statistical element index points, means simultaneously comparing the data of corresponding statistical element index points at two successive occurrences, storage read means positioned at a reference position corresponding to the earlier cycle of said statistical element index point, recording means, means interconnecting said recording means with said storage read means and with said comparing means at a reference position corresponding to the earlier cycle of the statistical element index position, circuit means responsive to conditions in said comparing means for operating said recording means to record simultaneously the information at said storage read means and said comparing means at said reference position when said comparing means detects a change in condition.

12. A device for analyzing a television or radio listening survey tape having mark means thereon indicating the survey set tuned position at cyclically repeated intervals comprising, a storage tape having a plurality of index positions assigned to correspond to the survey set position on said survey tape, means comparing the statistical tape to detect the tuned position for any survey set at two successive survey set cycles, means reading and said storage tape at a reference position corresponding to the statistical tape mark indicating the earlier tuned position of the survey set being analyzed, recording means, means connecting the same with said storage tape read means and with said comparing means at said reference position, and circuit means operating said recording means to record the information in both tapes at said reference positions when the statistical tape mark indicates the tuned position of the survey set being analyzed has been changed between successive intervals.

13. A device for analyzing a television or radio listening survey tape having mark means thereon indicating the survey set tuned position at cyclically repeated intervals comprising a storage tape having a plurality of index positions assigned to correspond to the survey set positions on said survey tape, means comparing the statistical tape to detect marks indicating the tuned position for any survey set at two successive survey set cycles, means reading said storage tape at a reference position corresponding to the statistical tape mark indicating the earlier tuned position of the survey set being analyzed, storage tape count marking means positioned at an index position corresponding to the statistical tape index points indicating the latter tuned position of the survey set being analyzed, recording means, means connecting the same with said storage tape read means and with said comparing means at said reference position, means connecting said storage tape read means with said storage tape count marking means, and circuit means operating said recording means to record the information in both tapes at said reference position when the statistical tape marks indicate the tuned position of the survey set being analyzed has been changed between successive intervals and for operating said storage tape marking means to record a mark one greater in value than that at said storage tape read means where the statistical tape marks indicate that the tuned position of the survey set being analyzed has not been changed between successive intervals.

No references cited.